Patented Feb. 2, 1954

2,668,153

UNITED STATES PATENT OFFICE 2,668,153

METHOD OF MAKING A SPONGE MATERIAL AND THE PRODUCT RESULTING THEREFROM

Henry George Hammon, Stevensville, Mich., assignor, by mesne assignments, to Christopher L. Wilson, Columbus, Ohio No Drawing. Application April 28, 1951, Serial No. 223,650

3 Claims. (Cl. 260—2.5)

This invention relates to a method of making a sponge material and the product resulting therefrom.

In the copending application of Christopher L. Wilson, Serial No. 29,657, filed May 27, 1948, and now Patent No. 2,609,347 there is described and claimed methods of making expanded sponge materials by forming dispersed bubbles in a solution comprising polyvinyl alcohol and reacting the alcohol with formaldehyde or a material capable of releasing formaldehyde while the bubbles are present. In this method the solution of polyvinyl alcohol is preferably an aqueous solution and a homogeneous froth of dispersed discrete bubbles is formed therein. The polyvinyl alcohol is one containing less than 10% residual hydrolyzable material in the molecule. After the froth has been made it is maintained substantially stable and the alcohol is reacted with formaldehyde to bring about a gellation and solidification of the froth with a limited and partial coalescing of the bubbles simultaneously with the progression of the reaction. This reaction between the polyvinyl alcohol and formaldehyde takes place in the presence of an acid catalyst and is permitted to proceed until approximately 35 to 80%, and preferably 40 to 70%, of the hydroxyl groups of the alcohol have been reacted. The sponge material is then washed free of acid and unreacted ingredients to produce a strong inert, highly absorptive sponge.

In preparing the froth of polyvinyl alcohol, a froth stabilizing wetting agent is preferably used in order to maintain the froth stable during the reaction period except, of course, for the limited and partial coalescing of the bubbles. Typical foam stabilizing wetting agents are disclosed in the above copending application.

I have discovered that a sponge may be prepared having a roughened abrasive surface if at least a portion of the formaldehyde used in making the sponge is in the form of granular paraformaldehyde. These granules may be any size desired subject only to the limitation that the granules not be so large that they settle from the reacting solution before the increasing viscosity has reached the point where the granules will be supported. The largest particles that may be tolerated without undue settling out are ordinarily around 8 mesh. Particles of this size may be tolerated if the reacting mass is set rapidly with either a solution of formaldehyde serving as a portion of the formaldehyde or by employing a fast reacting paraformaldehyde. As it is necessary that the granular paraformaldehyde be dissolved substantially completely during the reacting time, this also places a practical limitation on the maximum particle size. As has been pointed out, about 8 mesh is the largest practical particle size and in commercial production I prefer to use particles substantially all of which have a maximum size of about 20 mesh. Sizes of screen openings for the mesh referred to in this application are those included in Fundamental Data Relating to Sieves of the Standard Screen Scale, "Report of the Committee on Standards," A. C. S. Yearbook, 1921–22.

The maximum particle size of the granular paraformaldehyde has been discussed above because smaller granules may be used if desired to give a finer texture to the sponge. No particular problems are encountered when using the finer granular paraformaldehyde. In general I prefer to use granules having a maximum particle size of about 20 to 50 mesh depending upon the texture desired in the resulting sponge.

As is discussed in the above mentioned copending application of Christopher L. Wilson, polyvinyl alcohol and formaldehyde are permitted to react until about 35 to 80%, and preferably 40 to 70%, of the hydroxyl groups of the polyvinyl alcohol molecule have been reacted. In the present invention, the same amount of granular paraformaldehyde or mixed granular and powdered formaldehyde or mixed granular paraformaldehyde and formaldehyde solution is used. Examination of the resulting sponge shows that wherever a granule of paraformaldehyde occurs in the reacting mass the sponge at this point is hard so that an abrasive surface is produced in the sponge. Apparently the granular material causes a high localized concentration of formaldehyde which causes a higher proportion of the hydroxyl groups in the polyvinyl alcohol to be reacted at this point. Thus while the major portion of the sponge mass will have 35 to 80% of the hydroxyl groups of the polyvinyl reacted, localized areas where the granular paraformaldehyde occurs will have a greater percentage of the hydroxyl groups reacted than is true in the remainder of the sponge.

As was pointed out above, all of the formaldehyde used may be in the form of granular paraformaldehyde if desired. Here the paraformaldehyde dissolves over the reaction time so that the entire mass can be reacted. If desired, of course, the granular material may be mixed with other forms of formaldehyde or formaldehyde releasing compositions.

In preparing the sponges of this invention a polyvinyl alcohol solution in water is mixed with an acid catalyst, a foaming agent which may be any of the foam stabilizing wetting agents listed in the above mentioned copending Wilson application, and granular paraformaldehyde. The solution is expanded to a froth preferably of maximum volume and the reaction is permitted to go to completion. The froth may easily be produced by beating air into the reacting solution. After the reaction has gone to completion the resulting sponge material is washed free of foaming agent, acid and unreacted materials. The following are examples of compositions used in making the sponge materials. Other examples will be similar to those described in the copending Wilson application 29,657, except that granular paraformaldehyde will be used in place of the portion or all of the formaldehyde in the examples.

*Example 1.*—Sponge material was made according to the above method employing the following ingredients: 145 grams of a 12.5% polyvinyl alcohol solution in water, 55 cc. of 55% sulfuric acid in water, 2 g. of a foaming agent, and 10 grams of granular paraformaldehyde 20 to 50 mesh.

*Example 2.*—Sponge material was made according to the above method employing the following ingredients: 145 grams of a 12.5% polyvinyl alcohol solution in water, 55 cc. of 55% sulfuric acid in water, 2 g. of a foaming agent, 5 grams of granular paraformaldehyde through 20 mesh, and 5 grams of finely ground paraformaldehyde.

*Example 3.*—Sponge material was made according to the above method employing the following ingredients: 145 grams of a 12.5% polyvinyl alcohol solution in water, 55 cc. of 55% sulfuric acid in water, 2 g. of a foaming agent, 5 grams of granular paraformaldehyde through 10 mesh, and 12.5 cc. of 37% formaldehyde solution.

Having described my invention as related to the embodiments set out herein, it is my intention that the invention be not limited by any of the details of description unless otherwise specified but rather be construed broadly within its spirit and scope as set out in the accompanying claims.

I claim:

1. A sponge material comprising the reaction product of polyvinyl alcohol and formaldehyde in which the major portion of the material has from about 35 to 80% of the hydroxyl groups of the polyvinyl alcohol reacted, and containing localized relatively hard sections of small extent in which a higher percentage of hydroxyl groups are reacted than are reacted in the remainder of the sponge material, said hard sections being formed by reacting the polyvinyl alcohol with granular paraformaldehyde substantially all the particles of which have a maximum size of about 20 mesh and in which substantially no particles are above 8 mesh in size.

2. A method of preparing a sponge material comprising reacting with formaldehyde, polyvinyl alcohol containing less than 10% residual hydrolyzable material in the molecule, in a foamed aqueous solution thereof, in the presence of an acid catalyst and a foam stabilizing wetting agent, granular paraformaldehyde substantially all the particles of which have a maximum size of about 20 mesh being used as a source of at least a portion of said formaldehyde, such that in the reaction product the major portion of the sponge material has from about 35 to 80% of the hydroxyl groups of the polyvinyl alcohol reacted, with the sponge material also containing localized, relatively hard sections of small extent in which a higher percentage of hydroxyl groups of the polyvinyl alcohol are reacted than are reacted in the remainder of the sponge material.

3. A method of preparing a sponge material comprising reacting with formaldehyde, polyvinyl alcohol containing less than 10% residual hydrolyzable material in the molecule, in a foamed aqueous solution thereof, in the presence of an acid catalyst and a foam stabilizing wetting agent, granular paraformaldehyde substantially all the particles of which have a maximum size of about 20 mesh and substantially no particles of which have a size above about 8 mesh being used as a source of at least a portion of said formaldehyde, such that in the reaction product the major portion of the sponge material has from about 35 to 80% of the hydroxyl groups of the polyvinyl alcohol reacted, with the material also containing localized, relatively hard sections of small extent in which a higher percentage of hydroxyl groups of the polyvinyl alcohol are reacted than are reacted in the remainder of the sponge material.

HENRY GEORGE HAMMON.

References Cited in the file of this patent

UNITED STATES PATENTS

| Number | Name | Date |
|---|---|---|
| 2,609,347 | Wilson | Sept. 2, 1952 |

FOREIGN PATENTS

| Number | Country | Date |
|---|---|---|
| 573,966 | Great Britain | Dec. 14, 1945 |

OTHER REFERENCES

Walker: "Formaldehyde," pp. 71 and 72, Reinhold Pub. Corp., N. Y., 1944.